D. SHAMBERGER & J. CARROLL.
Garlic-Separator.

No. 202,761.                Patented April 23, 1878.

WITNESSES:
Francis McArdle
C. Sedgwick

INVENTOR:
D. Shamberger
J. Carroll
BY Munn & Co
ATTORNEYS.

UNITED STATES PATENT OFFICE.

DANIEL SHAMBERGER AND JOHN CARROLL, OF BECKLEYSVILLE, MD.

IMPROVEMENT IN GARLIC-SEPARATORS.

Specification forming part of Letters Patent No. 202,761, dated April 23, 1878; application filed March 20, 1878.

*To all whom it may concern:*

Figure 1:
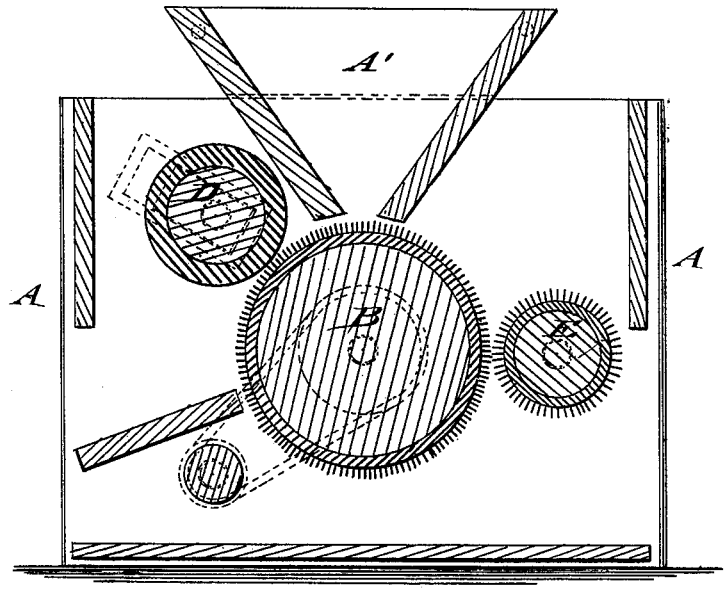
Figure 2:
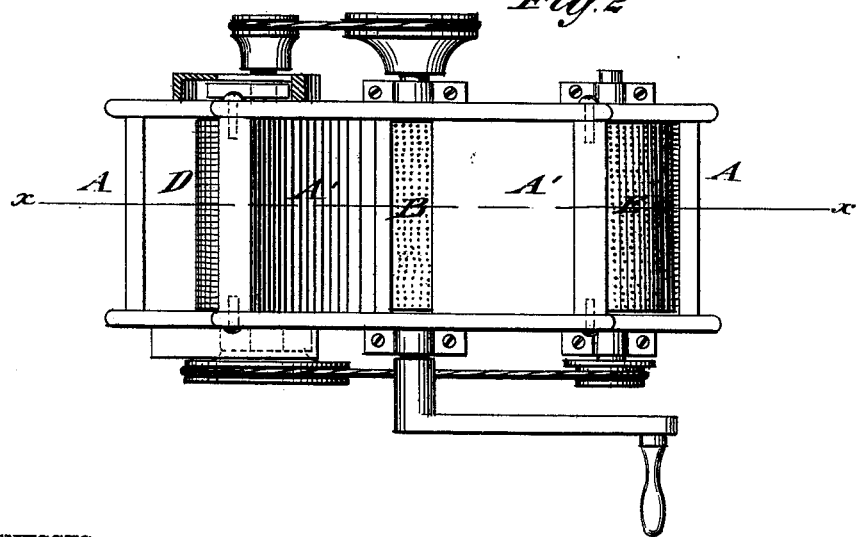

Be it known that we, DANIEL SHAMBERGER and JOHN CARROLL, of Beckleysville, in the county of Baltimore and State of Maryland, have invented a new and Improved Machine for Separating Garlic from Grain, of which the following is a specification:

In the accompanying drawing, Figure 1 represents a vertical longitudinal section on line $x\,x$, Fig. 2, of our improved machine for separating garlic from grain, &c., and Fig. 2 is a top view of the same.

Similar letters of reference indicate corresponding parts.

This invention relates to an improved machine or apparatus for cleaning grain, wheat, rye, &c., of garlic; and the invention consists of a revolving cylinder, having teeth or cards, in combination with a pressure-roller at one side, and a clearing-brush for the garlic at the opposite side thereof, the grain being conducted off below the pressure-roller, and the garlic below the clearing-brush.

Referring to the drawing, A represents the frame of our improved garlic-separator, and B a cylindrical roller or drum, that is covered with cards or wire teeth of the required degree of fineness, and revolved by a crank or pulley at one end, the shaft of the cylinder turning in suitable bearings of frame A.

The grain, wheat, rye, &c., is fed through the cylinder by means of a top hopper, A', having the usual adjusting devices for regulating the flow, and then passed through between the cylinder B and a revolving pressure-roller, D, that is covered with rubber, leather, cloth, or other soft material, or, if desired, with wire teeth, in the same manner as the cylinder B.

During the passage of the grain between the cylinder and roller, the garlic is pressed on the points of the wire teeth, and remain there until taken off or cleared from the cylinder by a revolving brush, E, that is arranged at the opposite side of the cylinder.

The brush may be made either revolving or stationary, and the bristles may be any suitable material, such as wire, hair, &c.

In place of one pressure-roller, two or more smaller ones may be arranged in connection with the cylinder, so as to secure the perfect cleaning of the grain.

The pressure-roller and clearing-brush are driven by belt-and-pulley connections, with the shaft of the cylinder, and the grain conducted off by an inclined board below the pressure-roller. As the grain is harder than the garlic, it will pass through between the cylinder and pressure-roller without being pierced by the teeth, the pressure-roller, however, being soft enough to "give" for the grain, but hard enough to press the garlic on the points of the teeth of the cylinder, so that it is held thereon until brushed off.

The machine may be made as an independent garlic-separator, or the parts employed in a grain-separator of any suitable construction, being then an auxiliary attachment thereto.

Having thus described our invention, we claim as new and desire to secure by Letters Patent—

A garlic-separator consisting of a revolving cylinder with teeth or cards, and of a revolving pressure-roller at one side, and of a clearing-brush at the other side thereof, substantially as and for the purpose described.

DANIEL SHAMBERGER.
JOHN CARROLL.

Witnesses:
JACOB HOSHALL,
THOMAS E. ENSOR.